2 Sheets—Sheet 1.
C. MESSENGER.
Grain-Drill.
No. 24,042.　　　　　　　　　　　　　　Patented May 17, 1859.
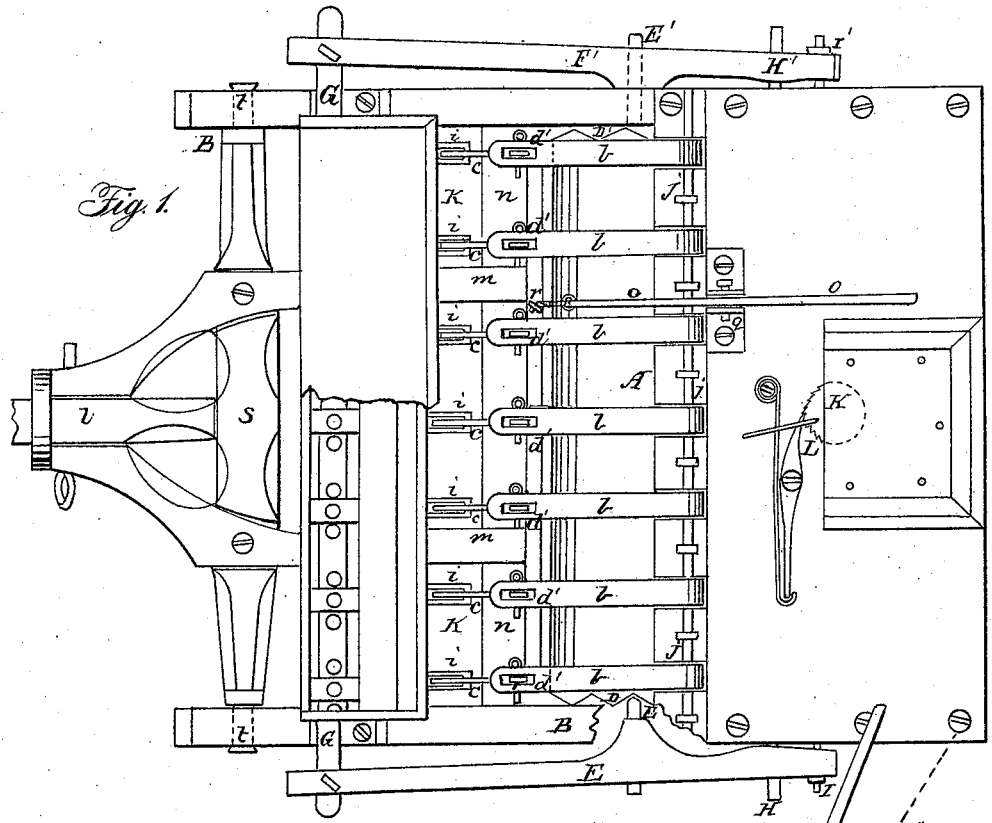
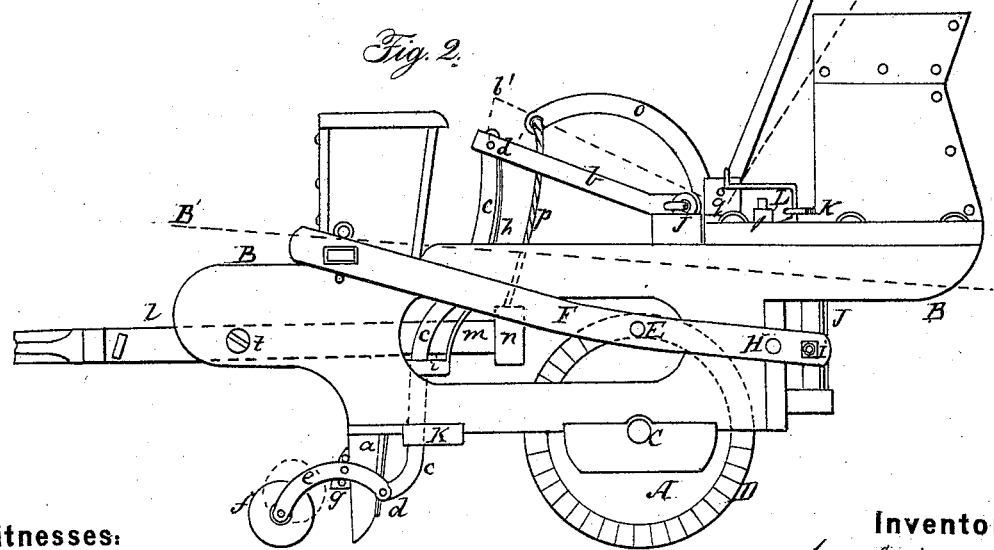
Witnesses:
D. D. Hopper
Geo. F. Brown
Inventor:
Chas. Messenger C. MESSENGER.
Grain-Drill.
No. 24,042.
2 Sheets—Sheet 2.
Patented May 17, 1859.
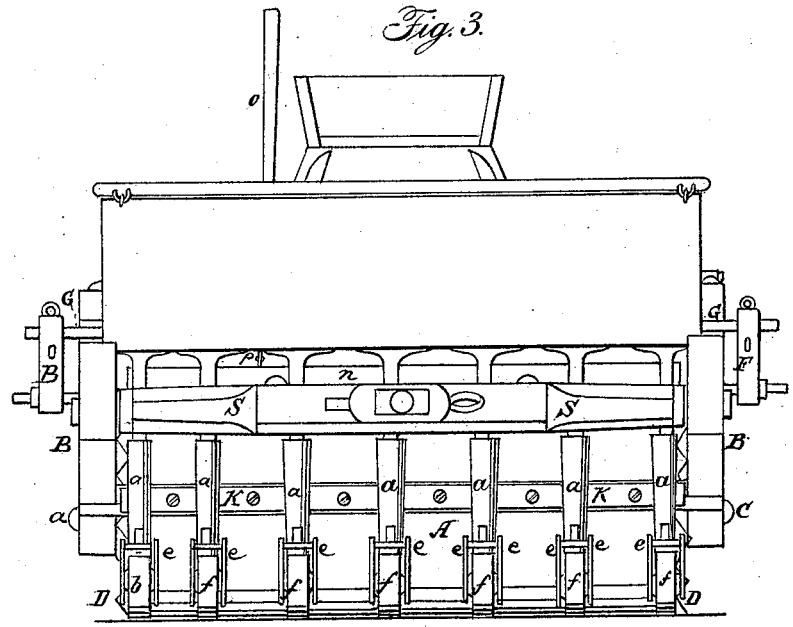
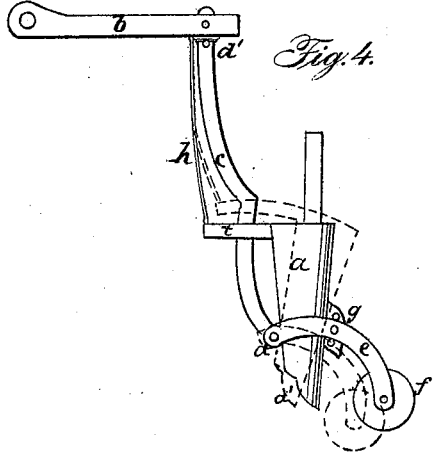
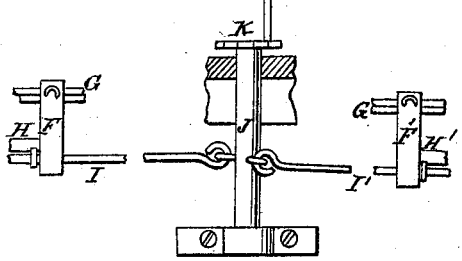
Witnesses:
Inventor:

UNITED STATES PATENT OFFICE.

CHARLES MESSENGER, OF WARREN, OHIO.

IMPROVEMENT IN SEEDING-MACHINES.

Specification forming part of Letters Patent No. 24,042, dated March 17, 1859.

*To all whom it may concern:*

Be it known that I, C. MESSENGER, of Warren, in the county of Trumbull and State of Ohio, have invented a certain new and Improved Seeding-Machine and Ground-Roller Combined; and I do hereby declare that the following is a full and exact description of the same, reference being had to the annexed drawings, making part of this specification, in which—

Figure 1 is a plan view; Fig. 2, a side view; Fig. 3, a front end view.

Like letters denote like parts in the several views.

This machine is designed for a twofold purpose, it being a seeding-machine and a ground-roller, which roller, also, in this machine takes the place of wheels in ordinary machines for sowing grain.

The roller A, upon which the machine is mounted, may be used as a ground-roller separately without the seeding apparatus.

The frame B may be arranged in any manner suitable for the object designed, to which is connected the roller A by means of two axles, C C, Figs. 2, 3, which revolve in boxes. On each end of the roller is secured a cam, D and D'. These cams are so arranged that the depression in one of the cams corresponds with the projection in the cam at the other end of the roller. By the action of these cams on the studs E E' and arms F F', Figs. 1, 2, a reciprocating motion is given to the grain-slide G, to each end of which the arms F F' are connected by a pin-joint or its equivalent, so as to allow a joint at the connection of the arms with the slide. This slide extends the entire length through the seed-box, and through which the seed passes in the usual manner to the spouts. The arms F F' are hung each upon a pivot at H H' in such manner as to allow the arms to move in accordance with the action of the cams D D'. To the back end of each arm are connected the rods I I' by means of a screw-nut. These rods are hooked to the shaft J, Figs. 2, 5. This shaft is provided with proper bearings or boxes above and below the connection of the rods. At the upper end of the shaft is keyed the ratchet-wheel K, to which is attached an arm for turning the shaft J. By turning this shaft in the proper direction the arms F F' are drawn close together, so that the studs E E' are brought in close contact with the cams for operating the grain-slide, and by turning the shaft J in a reverse direction the arms will be so released that the studs will pass out of the cams. The studs and arms are held in the desired position, either in or out of the cams, by the ratchet K and spring-catch L, Figs. 1, 2. By this means the grain may be sown or stopped at any time, as the nature of the case may require. The ratchet and spring-catch being close to the driver's seat, it is directly under his control.

The grain passes from the seed-box through tubes into the spouts a, Figs. 3, 4. Each of these spouts is connected to a lever, b, by the arm c. The connections d d' of the arm c with the spout and lever are formed by a pin-joint, so as to allow a certain required movement of these parts, hereinafter described. On each side of the spouts is placed a curved lever, e, which are pivoted to the spouts at d with the arms c. Between and at the opposite ends of the curved lever e is connected a roller or wheel, f, Figs. 3, 4. In front of the spouts is a lug, g, in which are a series of holes, and through which and the curved levers passes a pin, by means of which the spouts may be set more or less deep in the ground, and by the rollers f preceding the spouts they will always be kept in a uniform depth, and the rollers will always carry the spouts easily over obstructions, and in case one or more spouts should strike against any obstacle in the ground the end of the spout would be thrown back, as shown at a', Fig. 4, so as to move easily over the obstacle, and the roller f and curved lever e would be depressed correspondingly, which would tend to raise the spouts over the obstruction, and as soon as the obstacle is passed the spring h, by its force, would move back the spout to its first position. This spring is connected to the upper part of the arm c and presses upon a slotted finger, i, which is attached to each spout. The levers b are all pivoted upon the rod j, Figs. 1 and 2. By this means the spouts will raise up and down together or separately, according to the nature of the case. The fingers i rest upon the girt k, which forms a part of the frame-work and extends from one side of the machine to the other. This girt, by means of the fingers, holds up the spouts from the ground when the seeding apparatus is not required for use. In this girt are slots through which the arms c pass, and by means of which and the levers $b$ the spouts are retained in an upright position.

From the rear end of the tongue $l$ extend two arms, $m\ m$, Figs. 1 and 2, to which is connected the cross-bar $n$. This cross-bar is connected to the lever $o$ by the cord $p$ or its equivalents. The long arm $o'$ of this lever extends up by the side of the driver's seat, so as to be convenient for him to operate it. The fulcrum of this lever is at $q$, and by drawing the arm $o'$ of the lever to $o''$ the lever $b$ will be raised to $b'$ and the front end of the machine will be raised to $B'$, and the spouts and rollers will also be raised correspondingly and supported by the girt $k$, as before stated. The action of the arm $o'$ in being drawn back to $o''$ raises the cross-bar $n$, which is connected to the tongue, the front end of which forms the fulcrum and the cross-bar when the power is applied. Hence it follows that by raising the cross-bar the front end of the machine and the connected parts will be raised accordingly by the pivoted or jointed connection of the hound-bar $s$ with the front end of the frame at $t$, Figs. 1 and 2. The whole of the spouts may be thus raised at once for passing over obstructions or otherwise, and by thus raising the spouts and disconnecting the studs so, that no seed will be sown, the ground-roller may be used separately without the seeding apparatus.

By means of the rollers $f$ the spouts may be so regulated that the seed will be sown at any required depth. The position of the curved levers will so place the rollers as to regulate the depth of the spout in the ground, as set forth.

What I claim as my improvement, and for which I desire to secure Letters Patent, is—

1. The lever $b$, arm $c$, levers $e$, and spring $h$, when arranged substantially as described, and in combination with a combined seeding-machine and ground-roller.

2. The studs E E', arms F F', rods I I', and shaft J, in combination with the cams D D', substantially as set forth, and when used in connection with the seeding-machine and ground-roller combined.

CHARLES MESSENGER.

Witnesses:
  D. D. HOPPER,
  GEO. F. BROWN.